(12) United States Patent
Spigno et al.

(10) Patent No.: US 10,446,883 B2
(45) Date of Patent: *Oct. 15, 2019

(54) METHODS FOR FAST-CHARGING BATTERIES

(71) Applicant: GM GLOBAL TECHNOLOGY OPERATIONS LLC, Detroit, MI (US)

(72) Inventors: Ciro A. Spigno, Waterford, MI (US); Brian J. Koch, Berkley, MI (US); Ryan B. Moulliet, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/916,771

(22) Filed: Mar. 9, 2018

(65) Prior Publication Data

US 2019/0280345 A1  Sep. 12, 2019

(51) Int. Cl.
| | | |
|---|---|---|
| *H02J 7/00* | (2006.01) | |
| *H01M 10/44* | (2006.01) | |
| *H01M 10/0525* | (2010.01) | |
| *H01M 4/66* | (2006.01) | |
| *H01M 2/16* | (2006.01) | |
| *H01M 4/02* | (2006.01) | |

(52) U.S. Cl.
CPC .......... *H01M 10/44* (2013.01); *H01M 2/16* (2013.01); *H01M 4/661* (2013.01); *H01M 10/0525* (2013.01); *H01M 2004/027* (2013.01); *H01M 2004/028* (2013.01); *H01M 2300/0065* (2013.01)

(58) Field of Classification Search
CPC ..................................................... H01M 10/44
USPC ......................................................... 320/125
See application file for complete search history.

(56) References Cited

U.S. PATENT DOCUMENTS

| 4,583,034 | A | * | 4/1986 | Martin | .................. | H02J 7/0078 |
| | | | | | | 320/134 |
| 5,818,115 | A | * | 10/1998 | Nagao | ...................... | F02N 11/04 |
| | | | | | | 290/31 |
| 5,969,624 | A | * | 10/1999 | Sakai | ........................ | B60K 6/46 |
| | | | | | | 340/636.1 |
| 6,336,063 | B1 | * | 1/2002 | Lennevi | .................... | B60K 6/28 |
| | | | | | | 701/22 |
| 2002/0113441 | A1 | * | 8/2002 | Obayashi | .................. | H02J 1/14 |
| | | | | | | 290/400 |

(Continued)

*Primary Examiner* — Yalkew Fantu (57) ABSTRACT

Methods for fast-charging battery packs having at least one lithium battery cell with an anode, a cathode, and a reference electrode (RE) comprise charging the battery in a first phase by maximizing charging current, subsequently charging the battery in a second phase by decreasing the charging current in response to an anode potential (AP) determined by a RE to maintain the AP at or above an AP threshold, and subsequently charging the battery in a third phase by decreasing the charging current in response to the cathode potential (CP) determined by the RE such that the CP is maximized without exceeding the cathode potential threshold. A controller can determine anode potential or cathode potential in real time using a cell potential signal and a cathode RE signal or an anode RE signal, respectively. The AP threshold is the AP above which substantially no lithium plating occurs.

20 Claims, 6 Drawing Sheets

(56) References Cited

U.S. PATENT DOCUMENTS

2008/0084179 A1* 4/2008 Emori ............... H02J 7/0016
320/109
2009/0020346 A1* 1/2009 Krauer ............... B60L 1/04
180/65.1

* cited by examiner

METHODS FOR FAST-CHARGING BATTERIES

BACKGROUND

Lithium ion batteries describe a class of rechargeable batteries in which lithium ions move between a negative electrode (i.e., anode) and a positive electrode (i.e., cathode). Liquid and polymer electrolytes can facilitate the movement of lithium ions between the anode and cathode. Lithium-ion batteries are growing in popularity for defense, automotive, and aerospace applications due to their high energy density and ability to undergo successive charge and discharge cycles.

Lithium-based batteries are finding increasing usage in powering electric motors and other devices in automobiles and in powering other consumer devices. High energy-capacity lithium-ion batteries are required for use in powering electric motors for driving the wheels of an automobile, and in many such applications a multi-cell, high voltage, lithium-ion battery is used. The use of such batteries in such applications requires that the electrochemical cells of the battery are continually discharged and re-charged.

SUMMARY

Methods for fast-charging battery packs are provided. The battery pack can include at least one battery cell having an anode, a cathode, and a reference electrode. The method includes charging the battery pack in a first phase by maximizing charging current until the anode potential determined by the reference electrode substantially reaches an anode potential minimum threshold, subsequently charging the battery pack in a second phase by decreasing the charging current in response to the determined anode potential such that the anode potential is minimized without falling below the anode potential threshold, and in response to the cathode potential substantially reaching a maximum cathode potential threshold, subsequently charging the battery pack in a third phase by decreasing the charging current in response to the cathode potential determined by the reference electrode such that the cathode potential is maximized without exceeding the cathode potential threshold. The method can further include ending battery pack charging when one or more of the battery pack has achieved a sufficient level of charge, at least one battery cell of the battery pack has achieved a maximum cell potential, or the charging current reaches a minimum value. The reference electrode can be disposed such that an electrolyte path is established between the reference electrode and the cathode or the anode. The cathode can be electrically connected to the anode via a circuit, and a lithium ion-containing electrolyte can be in contact with the anode and the cathode, and the battery pack can be charged by directing current from a power supply to the circuit. The cathode potential threshold can be the potential above which the electrolyte of the at least one battery cell begins to irreversibly oxidize. The anode potential threshold can be an anode potential above which substantially no lithium plating occurs while charging. The minimum anode potential threshold of the battery pack can be determined using one or more calibration battery cells characteristic of the at least one battery cell of the battery pack by first charging the one or more calibration battery cells as described above and measuring the charging current during one or more of the second phase or the third phase, determining the derivative of the measured charging current with respect to time, and examining the derivative data over the second phase and/or the third phase to determine whether the derivative data presents a smooth curve or a curve with a local discontinuity. A smooth curve can indicate the absence of lithium plating and a curve with a local discontinuity can indicate the presence of lithium plating. Second, the described battery pack charging method can be iteratively implemented using a higher anode potential test threshold than the previous iteration if lithium plating occurred during the previous iteration or using a lower anode potential threshold than the previous iteration if no lithium plating occurred during the previous iteration. Third, the lowest anode potential test threshold which exhibited substantially no lithium plating can be selected as the anode potential threshold. The minimum anode potential threshold of the battery pack can further be determined by determining the derivative of the measured potential with respect to time or charge, and examining the derivative data over the first phase and/or the third phase. The measured potential of a characteristic of the battery pack can be one or more of the anode potential, the cathode potential, and/or the cell potential of at least one battery cell of the battery pack.

Other methods for fast-charging battery packs are provided. The battery pack can include at least one battery cell having an anode, a cathode, and a reference electrode. The method includes charging the battery pack in a first phase by maximizing charging current, subsequently charging the battery pack in a second phase such that the anode potential is minimized without falling below the anode potential threshold, and subsequently charging the battery pack in a third phase such that the cathode potential is maximized yet without exceeding a cathode potential threshold. The method can further include ending battery pack charging when one or more of the at least one battery cell has achieved a sufficient level of charge, the battery pack has achieved a maximum cell potential, or the charging current reaches a minimum value. Maximizing charging current can be determined by the limitations of the battery pack hardware and/or the external charger hardware. The reference electrode can be disposed such that an electrolyte path is established between the cathode or the anode. The first phase can end when the anode potential substantially reaches an anode potential minimum threshold. The second phase can end when the cathode potential substantially reaches the cathode potential threshold. The anode potential threshold can be the anode potential down to which substantially no lithium plating occurs while charging. The reference electrode can be an anode reference electrode, and the anode potential can be determined via a measurement from the anode reference electrode, and the cathode potential can be determined by adding the measurement from the anode reference electrode to a measured cell potential. The reference electrode can be a cathode reference electrode, and the cathode potential can be determined via a measurement from the cathode reference electrode, and the anode potential can be determined by subtracting a measured cell potential from the measurement of the cathode reference electrode. The minimum anode potential threshold of the battery pack can be determined using one or more calibration battery cells characteristic of the at least one battery cell of the battery pack by first charging the one or more calibration battery cells as described above and measuring the charging current during one or more of the second phase or the third phase, determining the derivative of the measured charging current with respect to time, and examining the derivative data over the second phase and/or the third phase to determine whether the derivative data presents a smooth curve or a curve with a local discontinuity. A smooth curve can indicate the absence of lithium plating and a curve with a local discontinuity can indicate the presence of lithium plating. Second, the described battery charging method can be iteratively implemented using a higher anode potential test threshold than the previous iteration if lithium plating occurred during the previous iteration or using a lower anode potential threshold than the previous iteration if no lithium plating occurred during the previous iteration. The minimum anode potential threshold of the battery pack can further be determined by determining the derivative of the measured potential with respect to time or charge, and examining the derivative data over the first phase and/or the third phase.

Although many embodiments are described in relation to lithium batteries and wired charging systems, batteries of various chemistries charged by wired and non-wired systems are germane to the disclosure herein. Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
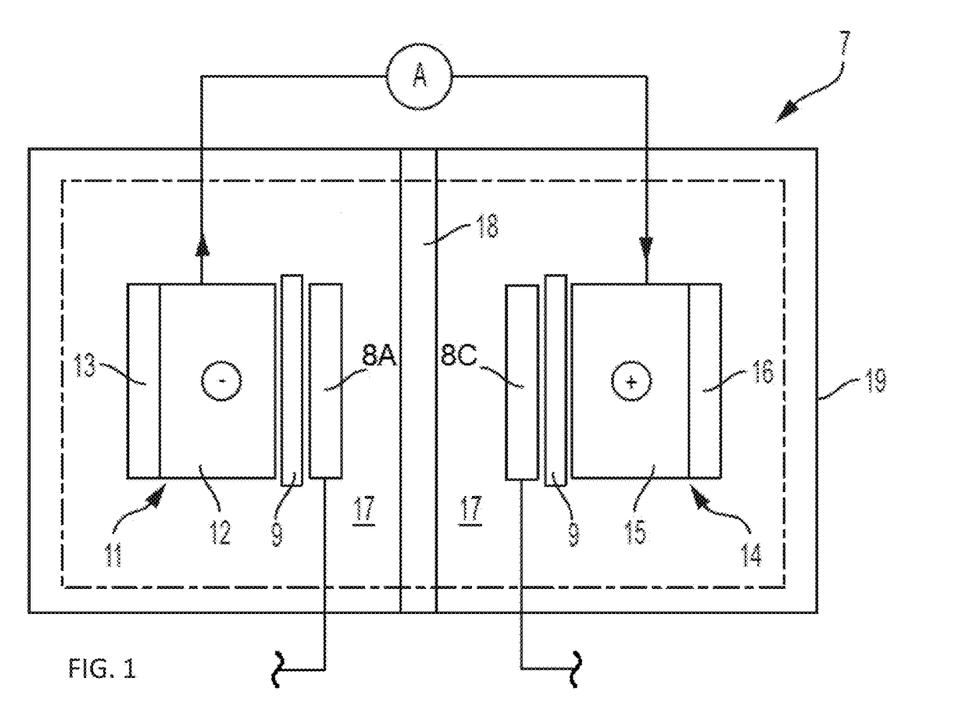
FIG. 1 illustrates a lithium battery cell, according to one or more embodiments.

FIG. 1 illustrates a lithium battery cell 7 comprising a negative electrode (i.e., the anode) 11, a positive electrode (i.e., the cathode) 14, an electrolyte 17 operatively disposed between the Anode 11 and the cathode 14, and a separator 18. Anode 11, cathode 14, and electrolyte 17 can be encapsulated in container 19, which can be a hard (e.g., metallic) case or soft (e.g., polymer) pouch, for example. The Anode 11 and cathode 14 are situated on opposite sides of separator 18 which can comprise a microporous polymer or other suitable material capable of conducting lithium ions and optionally electrolyte (e.g., a liquid electrolyte). Electrolyte 17 can comprise a solid electrolyte (e.g., polymer), a liquid electrolyte, or other suitable electrolytes. Liquid electrolytes 17 can include LiPF6, LiBF4, and LiClO4, among others, dissolved in a non-aqueous solvent. Polymer electrolytes 17 can include one or more polymers, such as polyethyleneoxide (PEO) or polyacrylonitrile, among others. Solid electrolytes can comprise alkali-ion solid electrolytes, such as those that include one or more lithium salts (e.g., LiPF6, LiBF4, LiClO4, LiSICON, or LiPON), among others.

Anode 11 generally includes a current collector 12 and a lithium intercalation host material 13 applied thereto. Cathode 14 generally includes a current collector 15 and a lithium-based active material 16 applied thereto. In one example, anode 11 comprises lithium. In one embodiment, anode 11 comprises lithium and cathode 14 comprises sulfur. Active material 16 can store lithium ions at a higher electric potential than intercalation host material 13, for example. The current collectors 12 and 15 associated with the two electrodes are electrically connected by an external circuit A (e.g., an interruptible circuit) that allows an electric current to pass between the electrodes to electrically balance the related migration of lithium ions. Although FIG. 1 illustrates host material 13 and active material 16 schematically for the sake of clarity, host material 13 and active material 16 can comprise an exclusive interface between the anode 11 and cathode 14, respectively, and electrolyte 17.

Host material 13 can include any lithium host material that can sufficiently undergo lithium ion intercalation, deintercalation, and alloying, while functioning as the negative electrode of the lithium ion battery 6. Host material 13 can also include a polymer binder material to structurally hold the lithium host material together. For example, in one embodiment, host material 13 can include graphite intermingled in one or more of of polyvinyldiene fluoride (PVdF), an ethylene propylene diene monomer (EPDM) rubber, carboxymethoxyl cellulose (CMC), and styrene, 1,3-butadiene polymer (SBR). Graphite and carbon materials are widely utilized to form the negative electrode because it exhibits favorable lithium ion intercalation and deintercalation characteristics, is relatively non-reactive, and can store lithium ions in quantities that produce a relatively high energy density. Other materials can also be used to form the host material 13, for example, including one or more of lithium titanate, silicon, silicon oxide, tin, and tin oxide. Anode current collector 12 can include copper, aluminum, stainless steel, or any other appropriate electrically conductive material known to skilled artisans. Anode current collector 12 can be treated (e.g., coated) with highly electrically conductive materials, including one or more of conductive carbon black, graphite, carbon nanotubes, carbon nanofiber, graphene, and vapor growth carbon fiber (VGCF), among others.

Active material 16 can include any lithium-based active material that can sufficiently undergo lithium intercalation and deintercalation while functioning as the positive electrode of battery cell 7. Active material 16 can also include a polymer binder material to structurally hold the lithium-based active material together. One common class of known materials that can be used to form active material 16 is layered lithium transitional metal oxides. For example, in various embodiments, active material 16 can comprise one or more of spinel lithium manganese oxide (LiMn2O4), lithium cobalt oxide (LiCoO2), a nickel-manganese-cobalt oxide [Li(NixMnyCoz)O2], or a lithium iron polyanion oxide such as lithium iron phosphate (LiFePO4) or lithium iron fluorophosphate (Li2FePO4F) intermingled in at least one of polyvinyldiene fluoride (PVdF), an ethylene propylene diene monomer (EPDM) rubber, carboxymethoxyl cellulose (CMC), and styrene, 1,3-butadiene polymer (SBR). Other lithium-based active materials can also be utilized besides those just mentioned. Those alternative materials include, but are not limited to, lithium nickel oxide (LiNiO2), lithium aluminum manganese oxide (LixAlyMn1−yO2), and lithium vanadium oxide (LiV2O5), to name but a few. Cathode current collector 15 can include aluminum or any other appropriate electrically conductive material known to skilled artisans, and can be formed in a foil or grid shape. Cathode current collector 15 can be treated (e.g., coated) with highly electrically conductive materials, including one or more of conductive carbon black, graphite, carbon nanotubes, carbon nanofiber, graphene, and vapor growth carbon fiber (VGCF), among others.

Any appropriate electrolyte solution that can conduct lithium ions between Anode 11 and cathode 14 can be used in battery cell 7. In one embodiment, the electrolyte solution can be a non-aqueous liquid electrolyte solution that includes a lithium salt dissolved in an organic solvent or a mixture of organic solvents. Skilled artisans are aware of the many non-aqueous liquid electrolyte solutions that can be employed in battery cell 7 as well as how to manufacture or commercially acquire them. A non-limiting list of lithium salts that can be dissolved in an organic solvent to form the non-aqueous liquid electrolyte solution include LiClO4, LiAlCl4, LiI, LiBr, LiSCN, LiBF4, LiB(C6H5)4 LiAsF6, LiCF3SO3, LiN(CF3SO2)2, LiPF6, and mixtures thereof. These and other similar lithium salts can be dissolved in a variety of organic solvents such as, but not limited to, cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 18 can comprise, in one embodiment, a polyolefin. The polyolefin can be a homopolymer (derived from a single monomer constituent) or a heteropolymer (derived from more than one monomer constituent), either linear or branched. If a heteropolymer derived from two monomer constituents is employed, the polyolefin can assume any copolymer chain arrangement including those of a block copolymer or a random copolymer. The same holds true if the polyolefin is a heteropolymer derived from more than two monomer constituents. In one embodiment, the polyolefin can be polyethylene (PE), polypropylene (PP), or a blend of PE and PP. Separator 18 can optionally be ceramic-coated with materials including one or more of ceramic type aluminum oxide (e.g., Al2O3), and lithiated zeolite-type oxides, among others. Lithiated zeolite-type oxides can enhance the safety and cycle life performance of lithium ion batteries, such as battery cell 7.

The microporous polymer separator 18 may be a single layer or a multi-layer laminate fabricated from either a dry or wet process. For example, in one embodiment, a single layer of the polyolefin may constitute the entirety of the microporous polymer separator 18. As another example, however, multiple discrete layers of similar or dissimilar polyolefins may be assembled into the microporous polymer separator 18. The microporous polymer separator 18 may also comprise other polymers in addition to the polyolefin such as, but not limited to, polyethylene terephthalate (PET), polyvinylidene fluoride (PVdF), and or a polyamide (Nylon). The polyolefin layer, and any other optional polymer layers, may further be included in the microporous polymer separator 18 as a fibrous layer to help provide the microporous polymer separator 18 with appropriate structural and porosity characteristics. Skilled artisans will undoubtedly know and understand the many available polymers and commercial products from which the microporous polymer separator 18 may be fabricated, as well as the many manufacturing methods that may be employed to produce the microporous polymer separator 18.

Lithium ion battery cell 7, or a battery module or pack comprising a plurality of battery cells 7 connected in series and/or in parallel, can be utilized to reversibly supply power and energy to an associated load device. Lithium ion batteries may also be used in various consumer electronic devices (e.g., laptop computers, cameras, and cellular/smart phones), military electronics (e.g., radios, mine detectors, and thermal weapons), aircrafts, and satellites, among others. Lithium ion batteries, modules, and packs may be incorporated in a vehicle such as a hybrid electric vehicle (HEV), a battery electric vehicle (BEV), a plug-in electric vehicle (PEV), a plug-in HEV (PHEV), or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles). As used herein, "electric vehicle" (EV) refers to all such vehicles, including electric vehicle conversions of hybrid electric vehicles and conventional internal combustion engine vehicles. EV further refers to vehicles capable of charging via wireless and like methods.

Battery cell 7 generally operates by reversibly passing lithium ions between Anode 11 and cathode 14. Lithium ions move from cathode 14 to Anode 11 while charging, and move from Anode 11 to cathode 14 while discharging. At the beginning of a discharge, Anode 11 can contain a high concentration of intercalated lithium ions while cathode 14 is relatively depleted, and establishing a closed external circuit between Anode 11 and cathode 14 under such circumstances causes intercalated lithium ions to be extracted (i.e., de-intercalated) from Anode 11 (e.g., from host material 13). The extracted lithium atoms are split into lithium ions and electrons as they leave an intercalation host at an electrode-electrolyte interface. The lithium ions are carried through the micropores of separator 18 from Anode 11 to cathode 14 by the ionically conductive electrolyte 17 while, at the same time, the electrons are transmitted through the external circuit (e.g., to an external power-requiring circuit, such as electric motor 3) from Anode 11 to cathode 14 to balance the overall electrochemical cell. Electrons enter the cathode from the external circuit and facilitate the intercalation of lithium into active material 16. This flow of electrons through the external circuit can be harnessed and fed to a load device until the level of intercalated lithium in the negative electrode falls below a workable level or the need for power ceases.

A lithium battery (e.g., battery cell 7 and/or battery pack 6) may be recharged after a partial or full discharge of its available capacity (e.g., in the event of a lithium-depleted anode 11). As shown in FIG. 1, the arrows indicate that current is flowing out of Anode 11 and into cathode 14, and thus battery cell 7 is shown in a charging state. To charge or re-power the lithium ion battery cell, an external power source (not shown) is connected to the positive and the negative electrodes to drive the reverse of battery discharge electrochemical reactions (i.e., reduction at anode 11 and oxidation at cathode 14). That is, during charging, the external power source extracts the lithium ions present in cathode 14 to produce lithium ions and electrons. The lithium ions are carried back through the separator by the electrolyte solution, and the electrons are driven back through the external circuit, both towards Anode 11. The lithium ions and electrons are ultimately reunited at the negative electrode, thus replenishing it with intercalated lithium for future battery cell discharge.

Specifically, during charging of a lithium cell, lithium ions are intercalated from electrolyte 17 onto the surfaces of host material 13. The lithium ions encounter electrons entering the host material 13 per the charging current and react with host material 13 to form an intercalation compound. Without being bound to a particular mechanism, Equation (1) provides an example mechanism by which an intercalation compound is formed for a host material 13 comprising graphite:

$$xLi^+ + xe^- + C_6 \rightarrow Li_xC_6 \ (0 \leq x \leq 1) \quad (1)$$

Per Equation (1), six carbon atoms of the graphite crystal structure can accommodate up to one lithium atom in the intercalation process, driven by the applied charging potential. By this process, host material 13 is filled with (i.e., accommodates) lithium atoms at a reaction rate established by the environmental conditions at the anode site, the charging current, and other factors.

The continued capacity of a lithium battery (e.g., battery cell 7 and/or battery pack 6), particularly during many repeated charge-discharge cycles, depends in substantial measure on the effective movement of lithium into and out of the materials, often particulate materials, of the opposing electrodes. During battery charging not all lithium entering host material 13 may be accommodated to a suitable intercalated form (e.g., an LiC6 intercalation form for a host material 13 comprising graphite) and lithium plating may occur. In general, the ease with which lithium ions are reduced creates a risk of undesired lithium plating within lithium-based batteries. Specifically, lithium ions (e.g., Li+) may deposit as metallic lithium when the conditions are such that lithium ion reduction is preferential to lithium intercalation. In such cases, lithium ions collect an electron and lithium metal is undesirably plated within, proximate, or contiguous to anode 11 (e.g., on a surface of host material 13). For example, at high charging currents, the Li+ ion transport rate to an anode may exceed the rate at which Li+ ions can intercalate into the anode host material. This problem can be particularly pronounced during fast charging with high current, charging at low ambient temperatures and slowed lithium ion movement, and regenerative braking in vehicles (i.e., where energy is captured from vehicle braking and used to charge an appurtenant battery or battery pack, such as battery pack 6). Because plated lithium metal does not function in the same manner as intercalated lithium, lithium plating can exacerbate battery performance and degrade the battery's life and durability in a number of ways. In particular, the reduction of free lithium ions causes an irreversible electrical capacity loss within a battery cell, and non-homogeneous dendritic plating can exhibit a discrete electrochemical voltage potential which can interfere with the basic functions of the lithium-ion battery cell such as by causing short circuiting between two paired electrodes. Further, plated lithium can react with electrolyte 17 to yield inert Li-containing compounds incapable of participating in cell charge/discharge activity. In some instances, chemical interactions between plated lithium and electrolyte 17 can cause severe thermal events. Thermal events can also result from direct short circuiting of the anode and cathode through plated lithium.

Battery cell 7 further includes one or more reference electrodes 8, denoted in FIG. 1 as cathode reference electrode 8C and anode reference electrode 8A. A battery cell 7 can include one or a plurality of reference electrodes 8 or a plurality of reference electrodes. Reference electrodes (e.g., reference electrode 8) are generally known in the art, and can comprise any material which is electrochemically compatible/stable with battery cell 7, and may have any reference potential so long as it is stable over time and its value is known relative to a standard electrochemical reduction-oxidation couple (e.g., a Li/Li+ reduction-oxidation couple). Reference electrode 8 can occupy various positions within a battery cell 7 such that an electrolyte 17 path between the reference electrode 8 and the anode 11 and/or the cathode 14 exists. A reference electrode 8 can further comprise an active material or host material (not shown), analogous to the active material 16 and the host material 13 of the anode 11 and cathode 14, respectively. A reference electrode 8 can comprise a single electrode, or an array distributed throughout or across the face of an electrode (e.g., anode 11 or cathode 14). An array can provide measurement redundancy, and resolve spatial variation of electrode potential, for example. A non-limiting example of suitable reference electrodes are disclosed in co-owned U.S. patent application Ser. No. 15/252,556. A reference electrode 8 can connect and communicate with devices external to battery cell 7 by conductive metal wires, foils, and the like. For example, a cathode reference electrode 8C and/or an anode reference electrode 8A can each communicate a cathode 14 potential and an anode 11 potential, respectively, to an external device. The external device can be a controller 102 (shown in FIG. 3), for example. The cell potential for a battery cell 7 can further be measured via circuit A, and circuit A may be in communication with devices external to battery cell 7, such as controller 102. Cell potential is the difference between the anode potential and cathode potential for a given cell; accordingly, anode potential can be determined using a measured cell potential and a measured cathode potential, and cathode potential can be determined using a measured cell potential and a measured anode potential.

Appurtenant to each of the one or more reference electrodes 8 of a battery cell 7 is, optionally, a reference electrode separator 9. Separator 9 generally serves to prevent short-circuiting between a reference electrode and an electrode (e.g., between an anode reference electrode 8A and anode 11). Separator 9 can comprise an electrically insulating and/or ion-conducting material, such as a film or coating, which is chemically compatible with the electrolyte 17 and the active material or host material of the reference electrode. Separator 9 can comprise a ceramic (e.g., alumina) coating applied directly to the reference electrode 8, for example. In general, FIG. 1 is presented schematically for the sake of illustration and clarity. Accordingly the scope of this disclosure is not intended to be limited to the exact orientation sand proportions of the elements shown therein.

Figure 2:
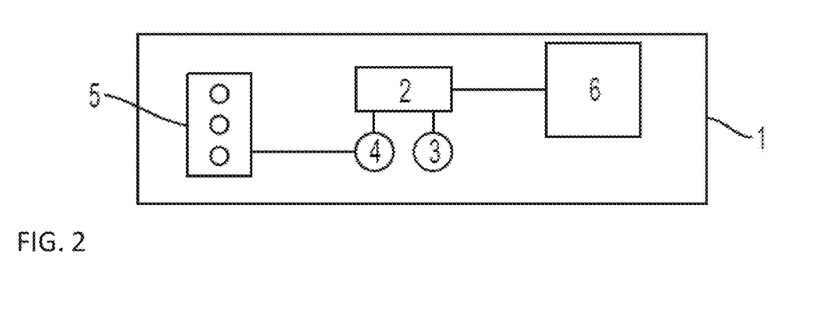
FIG. 2 illustrates a schematic diagram of a hybrid-electric vehicle, according to one or more embodiments.

FIG. 2 illustrates a schematic diagram of a hybrid-electric vehicle 1 including a battery pack 6 and related components. A battery pack such as the battery pack 6 can include a plurality of battery cells 7. A plurality of battery cells 7 can be connected in parallel to form a group, and a plurality of groups can be connected in series, for example. One of skill in the art will understand that any number of battery cell connection configurations are practicable utilizing the battery cell architectures herein disclosed, and will further recognize that vehicular applications are not limited to the vehicle architecture as described. Battery pack 6 can provide energy to a traction inverter 2 which converts the direct current (DC) battery voltage to a three-phase alternating current (AC) signal which is used by a drive motor 3 to propel the vehicle 1. An engine 5 can be used to drive a generator 4, which in turn can provide energy to recharge the battery pack 6 via the inverter 2. Engine 5 can comprise a gasoline or diesel engine, for example.

Figure 3:
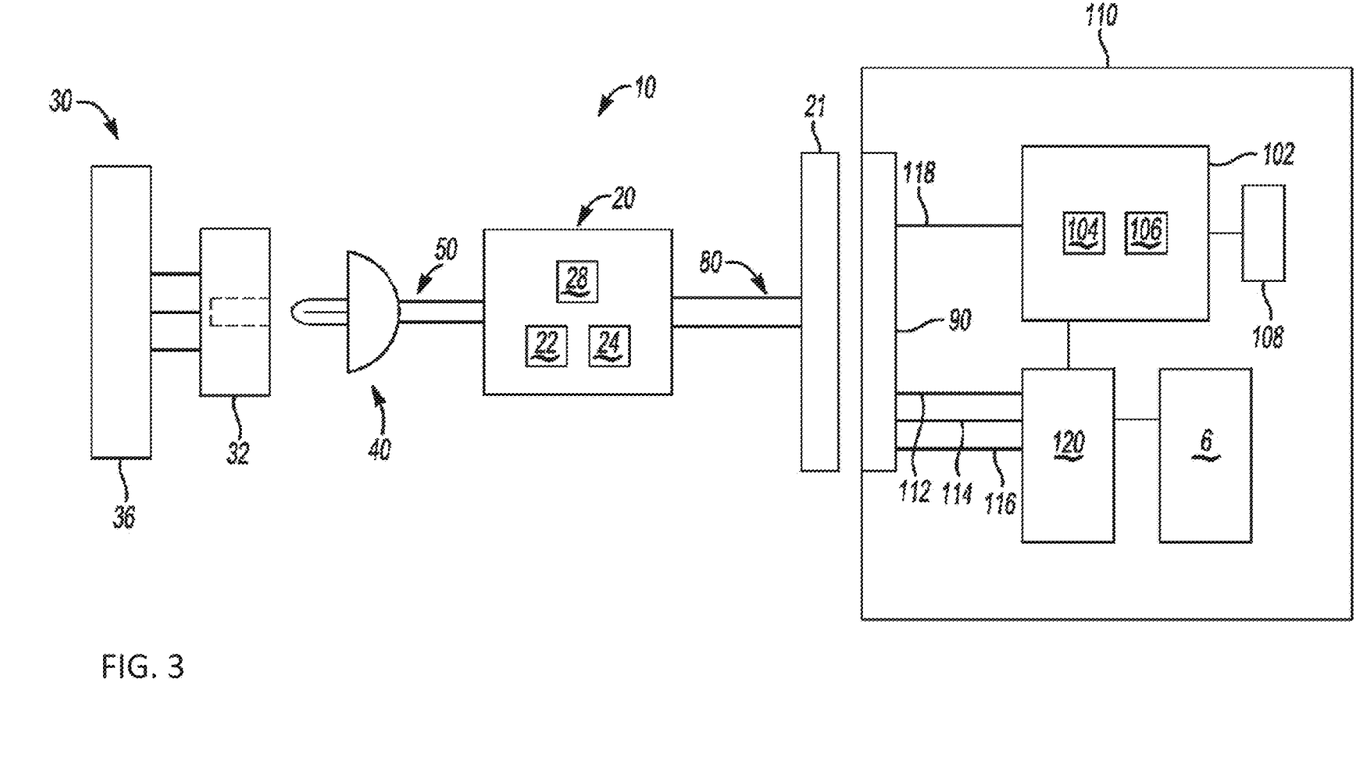
FIG. 3 illustrates a schematic of system for charging a battery pack, according to one or more embodiments.

External (e.g., grid) power can also be used to recharge the battery pack 6. For the purposes of illustration only, FIG. 3 illustrates a system 100 for charging battery pack 6, and for controlling a charge current received from a power supply 30. As shown, power supply 30 conveys charge current to battery pack 6 via a charge connector 10, but one of skill in the art will understand that the embodiments described herein are not to be limited by the aspects of system 100. For example, the description of charging methods in relation to system 100 does not preclude the suitability of wireless charging systems for the same methods. One such suitable wireless charging method is described in co-owned U.S. Patent Application Publication No.: U.S. 20180015833 "Dual inductive/conductive dc-coupled charging system".

System 100 includes a charge connector generally indicated at 10. The charge connector 10 includes a plug 40 for connecting the charge connector 10 to a power supply generally indicated at 30 and a coupler 21 for connecting the charge connector 10 to an inlet 90 of a charging system 110. The plug 40 is electrically connected to the control module 20 by a supply cord 50, and the coupler 21 is electrically connected to the control module 20 by a charging cord 80. The charging system 110, in the example shown, is a charging system 110 of an EV. The charging system 110 includes an inlet 90 for receiving the coupler 21 of the charge connector 10, and further includes a controller 102 including a CPU 104 and a memory 106.

Inlet 90 is in communication with controller 102, for example via a wire 118. As used herein, "in communication" refers to wired, wireless, or other communication means, such as those used to transmit data and/or signals. A single wire depicted in the drawing may be substituted by a plurality of wires, in some embodiments, and vice versa. By way of non-limiting example, the data and/or signals may include information regarding the condition of the power outlet 32, the condition of the plug-outlet interface between the power outlet 32 and the plug 40 which may include temperature data, voltage (i.e., potential) data including the voltage drop across the electrical connection between the plug 40 and the power outlet 32, diagnostic information including diagnostic codes, and/or commands including commands to de-rate or otherwise adjust the level of current flow and/or control the duty cycle of the output from the control module 20 and/or the charger 120 to limit the current flow provided by the charger 120 to the battery 6. Wire 118 may be utilized to transmit proximity signals between the controller 102 and a control module 20 of the charge connector 10. For example, a proximity signal may indicate when the coupler 21 of the charge connector 10 is fully connected to the inlet 90. The controller 102 can be configured to detect the proximity signal transmitted from the control module 20 prior to initiating charging of the battery 6 via the charger 120, to prevent charging of the battery 6 when the coupler 21 is not fully engaged to the inlet 90.

Control module 20 can include a CPU 24, a memory 22, and a sensor 28 for sensing voltage and/or current for sensing the voltage and/or current outgoing from the power source 36. Sensor 28 can output a voltage and/or current signal to the control module 20. The controller 102 is electrically connected to the inlet 90 and to the charger 120 such that the controller 102 is configured to communicate with the control module 20, such as when the charge connector 10 is connected to the inlet 90 via the coupler 21. For example, a voltage and/or current signal generated by sensor 28 can be communicated to the controller 102 by the control module 20. The charger 120 is configured to charge the battery 6 via power received from the power supply 30, such as via a positive wire 112, a neutral wire 114, and a ground wire 116. The charger 120 is operable to charge the battery 6 connected to the charger 120, in response to signals and/or commands received from the controller 102. The controller 102 and the charger 120 are electrically connected such that the controller 102 can control the charging cycle of the battery 6 being charged by the charger 120. Controlling the charger 120 includes controlling the level of current draw from the power source 36 and adjusting the flow of current to the battery 6 during the charge cycle, for example, based on a reference electrode potential signal received by the controller 102 from one or more reference electrodes 8 of one or more battery cells 7 of battery pack 6.

The controller 102 includes a computer and/or processor, and includes all software, hardware, memory, algorithms, connections, sensors, etc., necessary to manage and control the charging operation performed by the charging system 110, including controlling the charger 120 to charge the battery 6. For example, the controller 102 may include a central processing unit (CPU) 104 and sufficient memory 106, at least some of which is tangible and non-transitory. The memory 106 may include sufficient read only memory (ROM), random access memory (RAM), electrically-programmable read-only memory (EPROM), flash memory, etc., and any required circuitry including but not limited to a high-speed clock (not shown), analog-to-digital (A/D) circuitry, digital-to-analog (D/A) circuitry, a digital signal processor (DSP), and the necessary input/output (I/O) devices and other signal conditioning and/or buffer circuitry.

The charging system 110 can further include a user interface 108 which may be configured to display charging information to a user of the system 100, where the user may be a user of an EV including the charging system 110. The charging information displayed by the user interface 108 may be output by the controller 102 and received for display by the user interface 108. The charging information displayed by the user interface 108 may include one or more of the charging status of the EV and/or charging system 110, the state of charge of the battery 6, charging conditions including the level of current flow, the duration of the charge cycle, start and stop times for a charging cycle, the estimated time remaining to charge the battery 6 to a predetermined state of charge during a charge cycle, diagnostic codes output by the controller 102 and/or the control module 20, charging condition data such as outlet 32 temperature and/or voltage drop at the outlet 32, etc. The user interface 108 may be configured to display a history of charging events where each charge event corresponds to a charging cycle and may include one or more elements of the charging information.

Provided herein are battery charging methods which increase battery charging (i.e., anode lithium intercalation) rates while minimizing or preventing lithium plating. Methods disclosed herein will be described in reference to the lithium batteries described above (e.g., battery cell 7), however the disclosure is not intended to be limited thereby, and one of skill in the art will recognize that the methods disclosed herein are applicable to any battery susceptible to lithium or metal plating. The methods can be implemented the controller 102 of a vehicle, for example.

Figure 4:
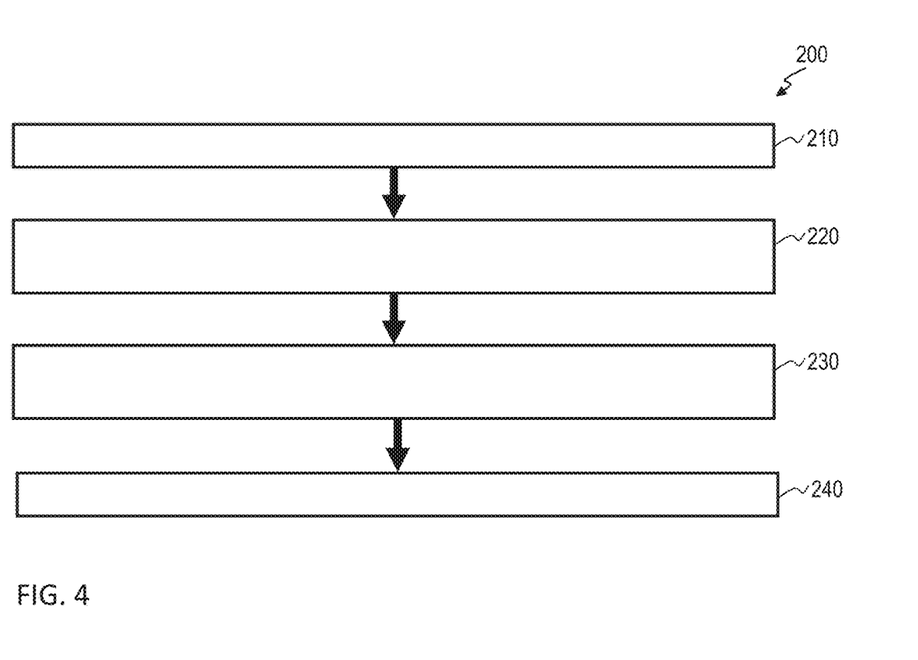
FIG. 4 illustrates a method for fast-charging a lithium battery, according to one or more embodiments.

FIG. 4 illustrates a method 200 for fast-charging a battery pack 6, such as a lithium battery pack of an EV. Battery pack 6 comprises at least one battery cell 7 having an anode 11, a cathode 14, and a reference electrode. The cathode 14 is electrically connected to the anode 11 via a circuit A, and an electrolyte 17 is in contact with the anode 11, the cathode 14, and the reference electrode 8, and wherein the battery cell 7 is charged by directing current from a power supply 30 to the circuit A. The electrolyte 17 can comprise lithium ions. Method 200 comprises charging 210 the battery in a first phase and maximizing charging current, subsequently charging 220 the battery in a second phase by decreasing the charging current such that the anode potential is minimized without falling below an anode potential threshold, and subsequently charging 230 the battery in a third phase by decreasing the charging current such that the cathode potential is maximized without exceeding the cathode potential threshold.

Method 200 can optionally further comprise ending battery charging 240 in a fourth phase after charging 230 in phase three. Ending battery charging 240 can occur when one or more of the battery pack 6 has achieved a sufficient level of charge (e.g., the battery has enough charge to power a vehicle for a desired range), the battery pack 6 has achieved a maximum cell potential, and the charging current reaches a minimum value. The charging current minimum value can be predefined, can be determined when the charging current reaches a lower asymptote, or can be defined by the point at which the battery charge is suitable. The maximum cell potential value can be predefined, can be determined when the cell potential reaches an upper asymptote, or can be defined by the point at which the battery charge is suitable.

The battery pack 6 can comprise at least one battery cell 7. While charging a battery, maximizing the charging current and/or minimizing the anode potential will reduce charging times. However, lithium plating occurs at the anode when the anode potential drops below the anode potential threshold. Accordingly, the battery is charged 210 during the first phase by maximizing charging current. A maximum charging current can be determined by the limitations of the battery hardware and/or the external charging hardware (e.g., charge connector 10 and/or power supply 30), for example. Further, charging 210 during the first phase ends when the when the anode potential reaches or substantially reaches the anode potential threshold. Specifically, charging 210 during the first phase ends when the anode potential determined by the reference electrode 8 substantially reaches the anode potential minimum threshold. As described above, the reference electrode 8 is disposed such that an electrolyte 17 path is established between the reference electrode 8 and the cathode 14 or the anode 11. In general, the anode potential threshold is an anode potential above which no, or substantially no, lithium plating occurs while charging.

In some embodiments, the reference electrode 8 comprises an anode reference electrode 8A, and the anode potential is determined via a measurement from the anode reference electrode 8A, and the cathode potential is determined by adding the measurement from the anode reference electrode 8A to a measured cell potential. In other embodiments, the reference electrode 8 comprises a cathode reference electrode 8C, and the cathode potential is determined via a measurement from the cathode reference electrode 8C, and the anode potential is determined by subtracting a measured cell potential from the measurement of the cathode reference electrode 8C. In other embodiments, at least one battery cell 7 of battery pack 6 comprises an anode reference electrode 8A and a cathode reference electrode 8C, and the anode potential is determined via a measurement from the anode reference electrode 8A and the cathode potential is determined via a measurement from the cathode reference electrode 8C. Similarly, in other embodiments, at least one battery cell 7 of battery pack 6 comprises an anode reference electrode 8A and at least one different battery cell 7 of battery pack 6 comprises a cathode reference electrode, and the anode potential is determined via a measurement from the anode reference electrode 8A and the cathode potential is determined via a measurement from the cathode reference electrode 8C.

While charging 220 during the second phase, the anode potential determined by the one or more reference electrodes 8 is minimized without falling below the anode potential threshold. Specifically, the charging current is decreased in response to the determined anode potential such that the anode potential is minimized without falling below the anode potential threshold. Accordingly, while charging 220 during the second phase, the anode potential generally remains substantially close to, but not below, the minimum anode potential threshold. For example, with relation to system 100, while charging 220, the controller can receive a reference electrode 8 signal and a cell potential signal, and can determine the anode potential if the reference electrode 8 is a cathode reference electrode 8C as described above. The controller 102 and/or control module 20 may determine the amount of adjustment to the charging current required to maintain the anode potential at a desired level (i.e., at or above the anode potential threshold). The controller 102 can be a PID controller, for example. The anode potential threshold can be stored in memory 22 of the controller 102 and/or control module 20, for example. The control module 20, in one example, can be configured to receive a current request signal from the controller 102. The current request signal may be generated by the controller 102 in response to input received from the charger 120 and/or the battery 6. For example, the charger 120 may signal the controller 102 to reduce current flow through the charger 120 to the battery 6 when the anode potential signal received and/or determined by the controller 102 from the reference electrode 8 is approaching and/or at the anode potential threshold.

Charging 220 during the second phase can end when the cell potential reaches or substantially reaches a cathode potential threshold. The cathode potential threshold can be a cathode potential above which battery cell 7 electrolyte 17 begins to irreversibly oxidize, for example. While charging 230 during the third phase, the cathode potential can be substantially constant. While charging 230 during the third phase, the charging current can be decreased such that the cathode potential remains close to, but not above, the cathode potential threshold. Specifically, while charging 230 during the third phase, the charging current can be decreased in response to the cathode potential determined by the reference electrode 8 such that the cathode potential is maximized without exceeding the cathode potential threshold. Charging 230 can begin after, or in response to the cathode potential determined by the reference electrode 8 substantially reaching a maximum cathode potential threshold. For example, with relation to system 100, while charging 230, the controller can receive a reference electrode 8 signal and a cell potential signal, and can determine the cathode potential if the reference electrode 8 is an anode reference electrode 8A as described above. The controller 102 and/or control module 20 may determine the amount of adjustment to the charging current required to maintain the cathode potential at a desired level (i.e., at or below the cathode potential threshold). The controller 102 can be a PID controller, for example. The cathode potential threshold can be stored in memory 22 of the controller 102 and/or control module 20, for example. The control module 20, in one example, can be configured to receive a current request signal from the controller 102. The current request signal may be generated by the controller 102 in response to input received from the charger 120 and/or the battery 6. For example, the charger 120 may signal the controller 102 to reduce current flow through the charger 120 to the battery 6 when the cathode potential signal received and/or determined by the controller 102 from the reference electrode 8 is approaching and/or at the cathode potential threshold.

Figure 5:
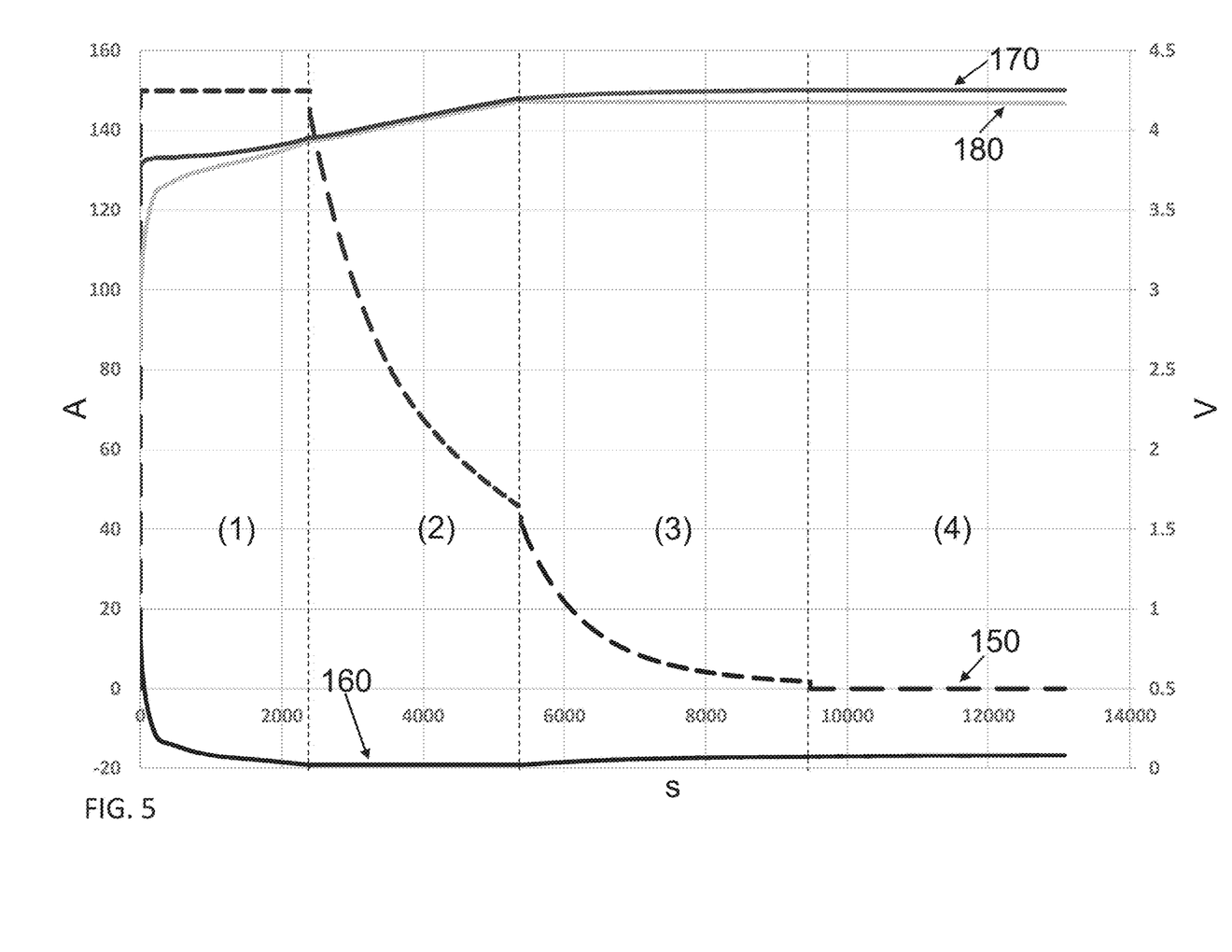
FIG. 5 illustrates a graph of lithium battery data collected during fast-charging of the battery, according to one or more embodiments.

FIG. 5 illustrates a graph of battery data collected during the implementation of method 200 (i.e., during the first phase (1), the second phase (2), the third phase (3) and the optional fourth phase (4)). FIG. 5 illustrates charging current 150 (in Amperes) with respect to time (in seconds). FIG. 5 also illustrates anode potential 160 (in Volts), cathode potential 170 (in Volts), and cell potential 180 (in Volts) with respect to time (in seconds).

Figure 6:
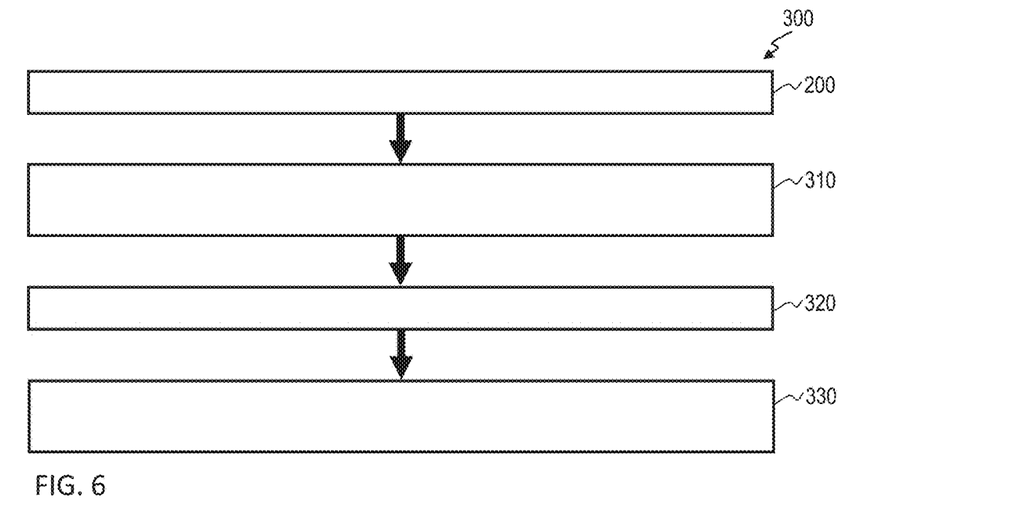
FIG. 6 illustrates a method for determining whether lithium plating occurs during the charging of a lithium battery, according to one or more embodiments.

In order to achieve a fast charge, the anode potential should be minimized during the second phase (2), but must not be lower than the anode potential threshold below which lithium plating occurs. A method 300 for determining the anode potential threshold for a battery cell 7 is illustrated in FIG. 6. Method 300 is conducted using one or more calibration battery cells which are characteristic of the at least one battery cell 7 of the battery pack 6. Method 300 comprises at least partially implementing method 200 with a prescribed anode potential threshold, measuring 310 the charging current and/or the potential (i.e., the voltage) of a characteristic of the calibration battery cell during implementation of method 200, determining 320 the derivative of the measured 310 charging current and/or potential with respect to time or charge (Q), and examining 330 the derivative data to determine whether the derivative data presents a smooth curve or a curve with a local discontinuity. In one embodiment at least partially implementing method 200 can comprise implementing phase 1. In one embodiment at least partially implementing method 200 can comprise implementing phase 1 and subsequently phase 4. In one embodiment at least partially implementing method 200 can comprise implementing phase 1 and subsequently implementing phase 2 and/or phase 3. In one embodiment at least partially implementing method 200 can comprise implementing phase 1, subsequently implementing phase 2 and/or phase 3, and subsequently implementing phase 4. A smooth curve can indicate the absence of lithium plating and a curve with a local discontinuity can indicate the presence of lithium plating. A local discontinuity can comprise an inflection point in the first derivative, a zero crossing in the second derivative, or a flat portion. The derivative determined 320 can be a first derivative and/or a second derivative. In some embodiments, measuring 310 comprises only measuring charging current and determining 320 comprises only determining the derivative of the measured 310 charging current. In some embodiments, measuring 310 comprises measuring charging current and optionally measuring the potential of a characteristic of the calibration battery cell, and determining 320 comprises determining the derivative of the measured 310 charging current and optionally determining the derivative of the measured 310 potential of a characteristic of the calibration battery cell.

Figure 7:
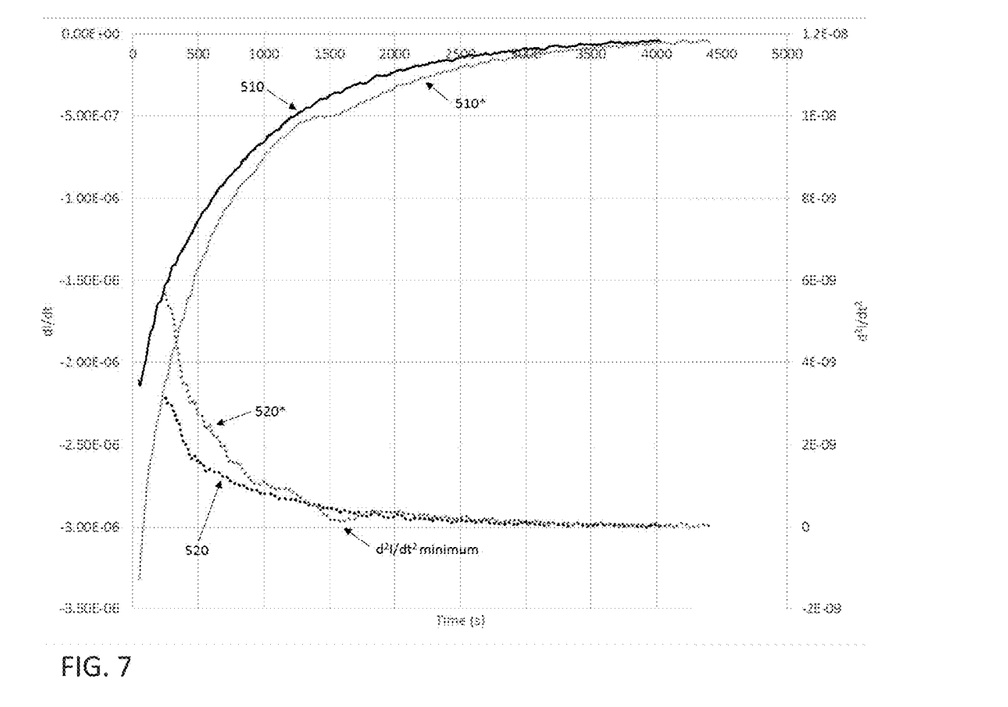
FIG. 7 illustrates a graph of lithium battery data collected during fast-charging of the battery, according to one or more embodiments.

In some embodiments, determining 320 the derivative of the measured 310 charging current with respect to time or charge (Q) can comprise determining the derivative of the measured charging current during phase 2 and/or phase 3 with respect to time. For example, FIG. 7 illustrates a graph of battery data collected during phase 3 of a calibration battery cell charged in accordance with method 200. FIG. 7 shows the first derivative of charging current 510 with respect to time (in seconds) (dI/dt), and the second derivative of charging current 520 with respect to time (in seconds) ($d^2I/dt^2$) for a battery charged using a prescribed 20 mV anode potential threshold; this data indicates an absence of lithium plating. FIG. 7 also shows the first derivative of charging current 510* with respect to time (in seconds) (dI/dt), and the second derivative of charging current 520* with respect to time (in seconds) ($d^2I/dt^2$) for a battery charged using a prescribed 10 mV anode potential threshold; this data indicates the presence of lithium plating. In particular, a flat non-continuity can be observed in the first derivative of charging current 510* (dI/dt) at about 1,500 seconds, and a local minimum can be observed in the second derivative of charging current 520* ($d^2I/dt^2$) at about 1,500 seconds.

Method 300 can comprise measuring 310 the potential of a characteristic of the battery, determining 320 the derivative of the measured potential with respect to time or charge, and examining 330 the derivative data over the first phase, the third phase, and/or the fourth phase. The measured 310 potential of a characteristic of the battery can comprise the anode potential ($V_{anode}$), the cathode potential ($V_{cathode}$), and/or the cell potential ($V_{cell}$). In one embodiment, determining 320 the derivative of the measured 310 potential with respect to time or charge can comprise determining the derivatives(s) of $V_{anode}$ during phase 1 and/or phase 3 with respect to charge. In one embodiment, determining 320 the derivative of the measured 310 potential with respect to time or charge can comprise determining the derivatives(s) of $V_{anode}$ and/or $V_{cell}$ during phase 4 with respect to time.

The measured potential of the characteristic of the battery can be IR compensated. IR-compensation removes from the measured potential any partial potential(s) of one or more components which do indicate lithium plating. Electronic resistance of conductors within a battery (e.g., metallic foils, tabs, busbars, etc.) and the host material and active material of respective electrodes, among others, may not influence or otherwise indicate the likelihood or occurrence of lithium plating. The potential drop across such resistors can be assessed and removed from the total measured potential so as isolate and identify the state of anode polarization with respect to factors (e.g., reaction kinetics and mass transport gradients) that directly indicate or relate to lithium plating. IR-compensation can be accomplished by current interrupt measurement, analysis of cell AC impedance data, and by model parameter estimation, among other means.

Figure 8:
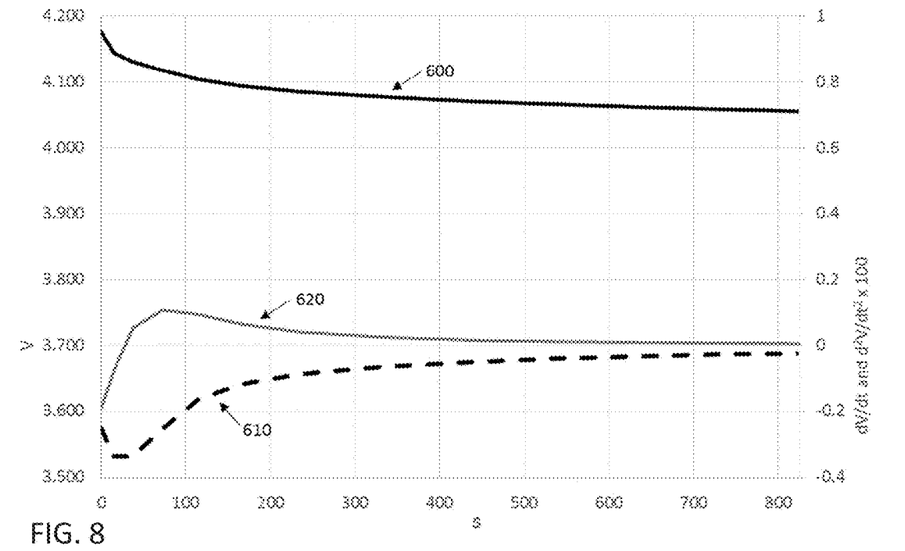
FIG. 8 illustrates a graph of lithium battery data collected during fast-charging of the battery, according to one or more embodiments.
Figure 9:
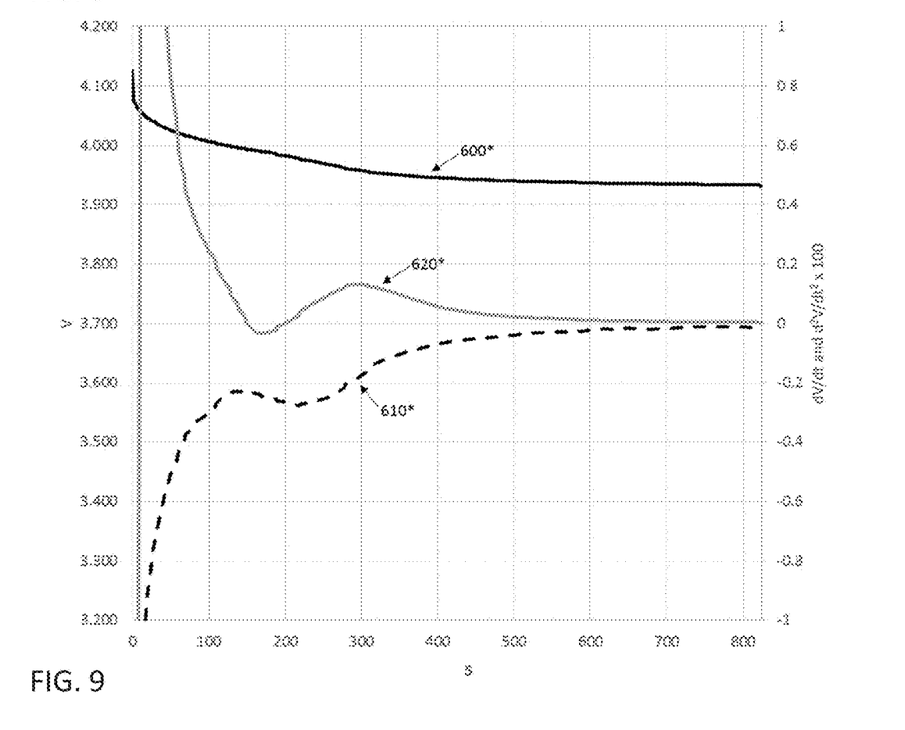
FIG. 9 illustrates a graph of lithium battery data collected during fast-charging of the battery, according to one or more embodiments.

FIG. 8 illustrates a graph of battery data collected during phase (1) of a battery charged at least partially in accordance with method 200 which indicates the absence of lithium plating. In particular, after charging in phase 1, the battery subsequently assumed a rest phase (i.e., phase 4). FIG. 8 shows cell potential 600 (in Volts), the first derivative of cell potential 610 with respect to time (in seconds) (dV/dt), and the second derivative of cell potential 620 with respect to time (in seconds) $(d^2V/dt^2)*200$. Similarly, FIG. 9 illustrates a graph of battery data collected during phase (1) of a battery charged at least partially in accordance with method 200 which indicates the presence of lithium plating. In particular, after charging in phase 1, the battery subsequently assumed a rest phase (i.e., phase 4). FIG. 9 shows cell potential 600 (in Volts), the first derivative of cell potential 610 with respect to time (in seconds) (dV/dt), and the second derivative of cell potential 620 with respect to time (in seconds) $(d^2V/dt^2)*200$. Returning to method 200, the anode potential threshold can be determined by iteratively utilizing method 300. In particular, if method 300 is implemented at a prescribed anode potential threshold and indicates lithium plating, method 300 can be subsequently implemented using a higher anode potential threshold to reduce or eliminate lithium plating. Similarly, if method 300 is implemented at a prescribed anode potential threshold and indicates no lithium plating, method 300 can be subsequently implemented using a lower anode potential threshold to increase charging speed. After iteratively utilizing method 300 to determine the anode potential threshold, the lowest anode potential test threshold which exhibited substantially no lithium plating can be selected as the anode potential threshold.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The invention claimed is:

1. A method for fast charging a lithium battery pack of a plug-in electric vehicle, wherein the battery pack comprises at least one battery cell having an anode, a cathode, and a reference electrode, the method comprising:
   charging the battery pack in a first phase by maximizing charging current until an anode potential determined by the reference electrode substantially reaches an anode potential minimum threshold;
   subsequently charging the battery pack in a second phase by decreasing the charging current in response to the determined anode potential such that the anode potential is minimized without falling below the anode potential threshold; and
   in response to the cathode potential substantially reaching a maximum cathode potential threshold, subsequently charging the battery pack in a third phase by decreasing the charging current in response to the cathode potential determined by the reference electrode such that the cathode potential is maximized without exceeding the cathode potential threshold.

2. The method of claim 1, wherein the anode potential threshold is an anode potential above which substantially no lithium plating occurs while charging.

3. The method of claim 1, wherein the minimum anode potential threshold of the battery pack is determined using one or more calibration battery cells characteristic of the at least one battery cell of the battery pack by first:
   charging the one or more calibration battery cells per the method of claim 1 and measuring the charging current during one or more of the second phase or the third phase;
   determining the derivative of the measured charging current with respect to time; and
   examining the derivative data over the second phase and/or the third phase to determine whether the derivative data presents a smooth curve or a curve with a local discontinuity, wherein a smooth curve indicates the absence of lithium plating and a curve with a local discontinuity indicates a presence of lithium plating;
second:
   iteratively implementing the battery pack charging method using a higher anode potential test threshold than a previous iteration if lithium plating occurred during the previous iteration or using a lower anode potential threshold than the previous iteration if no lithium plating occurred during the previous iteration; and
third:
   selecting the lowest anode potential test threshold which exhibited substantially no lithium plating as the anode potential threshold.

4. The method of claim 3, further comprising measuring the potential of a characteristic of the battery pack, determining the derivative of the measured potential with respect to time or charge, and examining the derivative data over the first phase and/or the third phase.

5. The method of claim 4, wherein the measured potential of a characteristic of the battery pack comprises one or more of the anode potential, the cathode potential, and/or the cell potential of at least one battery cell of the battery pack.

6. The method of claim 1, wherein the reference electrode is disposed such that an electrolyte path is established between the reference electrode and the cathode or the anode.

7. The method of claim 1, wherein the cathode is electrically connected to the anode via a circuit, and a lithium ion-containing electrolyte is in contact with the anode and the cathode, and wherein the battery pack is charged by directing current from a power supply to the circuit.

8. The method of claim 1, further comprising ending battery pack charging when one or more of the battery pack has achieved a sufficient level of charge, at least one battery cell of the battery pack has achieved a maximum cell potential, or the charging current reaches a minimum value.

9. The method of claim 1, wherein the cathode potential threshold comprises the potential above which an electrolyte of the at least one battery cell begins to irreversibly oxidize.

10. A method for fast charging a battery pack, wherein the battery pack comprises at least one battery cell having an anode, a cathode, and a reference electrode, the method comprising:
charging the battery pack in a first phase by maximizing charging current;
subsequently charging the battery pack in a second phase such that an anode potential is minimized without falling below an anode potential threshold; and
subsequently charging the battery pack in a third phase such that the cathode potential is maximized yet without exceeding a cathode potential threshold.

11. The method of claim 10, wherein the reference electrode is disposed such that an electrolyte path is established between the cathode or the anode.

12. The method of claim 10, wherein the first phase ends when the anode potential substantially reaches an anode potential minimum threshold.

13. The method of claim 10, wherein the second phase ends when the cathode potential substantially reaches the cathode potential threshold.

14. The method of claim 10, wherein the anode potential threshold is an anode potential above which substantially no lithium plating occurs while charging.

15. The method of claim 10, wherein the reference electrode comprises an anode reference electrode, and the anode potential is determined via a measurement from the anode reference electrode, and the cathode potential is determined by adding the measurement from the anode reference electrode to a measured cell potential.

16. The method of claim 10, wherein the reference electrode comprises a cathode reference electrode, and the cathode potential is determined via a measurement from the cathode reference electrode, and the anode potential is determined by subtracting the measured cell potential from the measurement of the cathode reference electrode.

17. The method of claim 10, wherein the minimum anode potential threshold of the battery pack is determined using one or more calibration battery cells characteristic of the at least one battery cell of the battery pack by first:
charging the one or more calibration battery cells per the method of claim 1 and measuring the charging current during one or more of the second phase or the third phase;
determining the derivative of the measured charging current with respect to time; and
examining the derivative data over the second phase and/or the third phase to determine whether the derivative data presents a smooth curve or a curve with a local discontinuity, wherein a smooth curve indicates the absence of lithium plating and a curve with a local discontinuity indicates the presence of lithium plating; and
second:
iteratively implementing the battery charging method using a higher anode potential test threshold than the previous iteration if lithium plating occurred during the previous iteration or using a lower anode potential threshold than the previous iteration if no lithium plating occurred during the previous iteration.

18. The method of claim 17, further comprising measuring the potential of a characteristic of the battery pack, determining the derivative of the measured potential with respect to time or charge, and examining the derivative data over the first phase and/or the third phase.

19. The method of claim 10, further comprising ending battery pack charging when one or more of the battery pack has achieved a sufficient level of charge, at least one battery cell of the battery pack has achieved a maximum cell potential, or the charging current reaches a minimum value.

20. The method of claim 10, wherein maximizing charging current is determined by limitations of the battery pack hardware and/or external charger hardware.

* * * * *